(No Model.)  2 Sheets—Sheet 1.
J. J. GREEN.
MACHINE FOR DISINTEGRATING HEMP, RAMIE, &c.
No. 388,662. Patented Aug. 28, 1888.
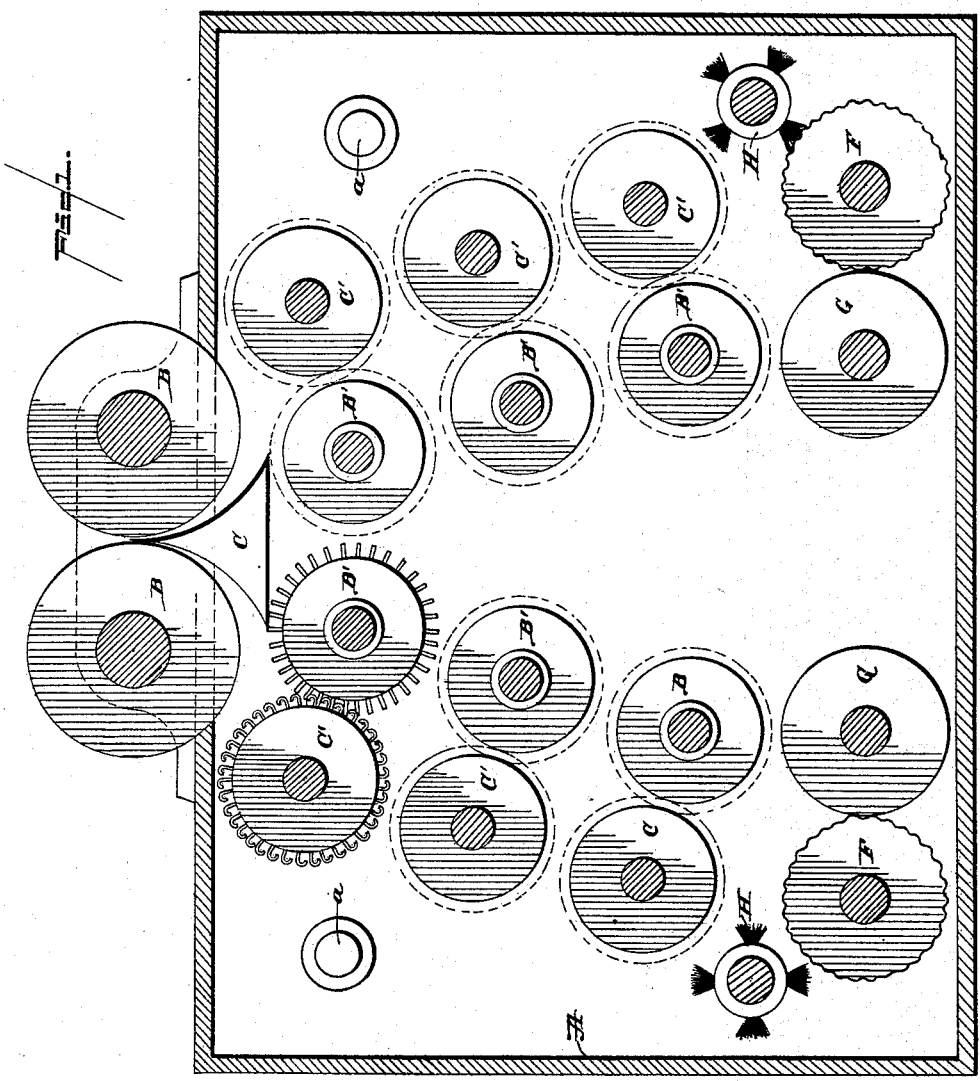
WITNESSES,
INVENTOR,
Joshua J. Green.
by Marcellus Bailey
his Attorney.

(No Model.) 2 Sheets—Sheet 2.
J. J. GREEN.
MACHINE FOR DISINTEGRATING HEMP, RAMIE, &c.
No. 388,662. Patented Aug. 28, 1888.
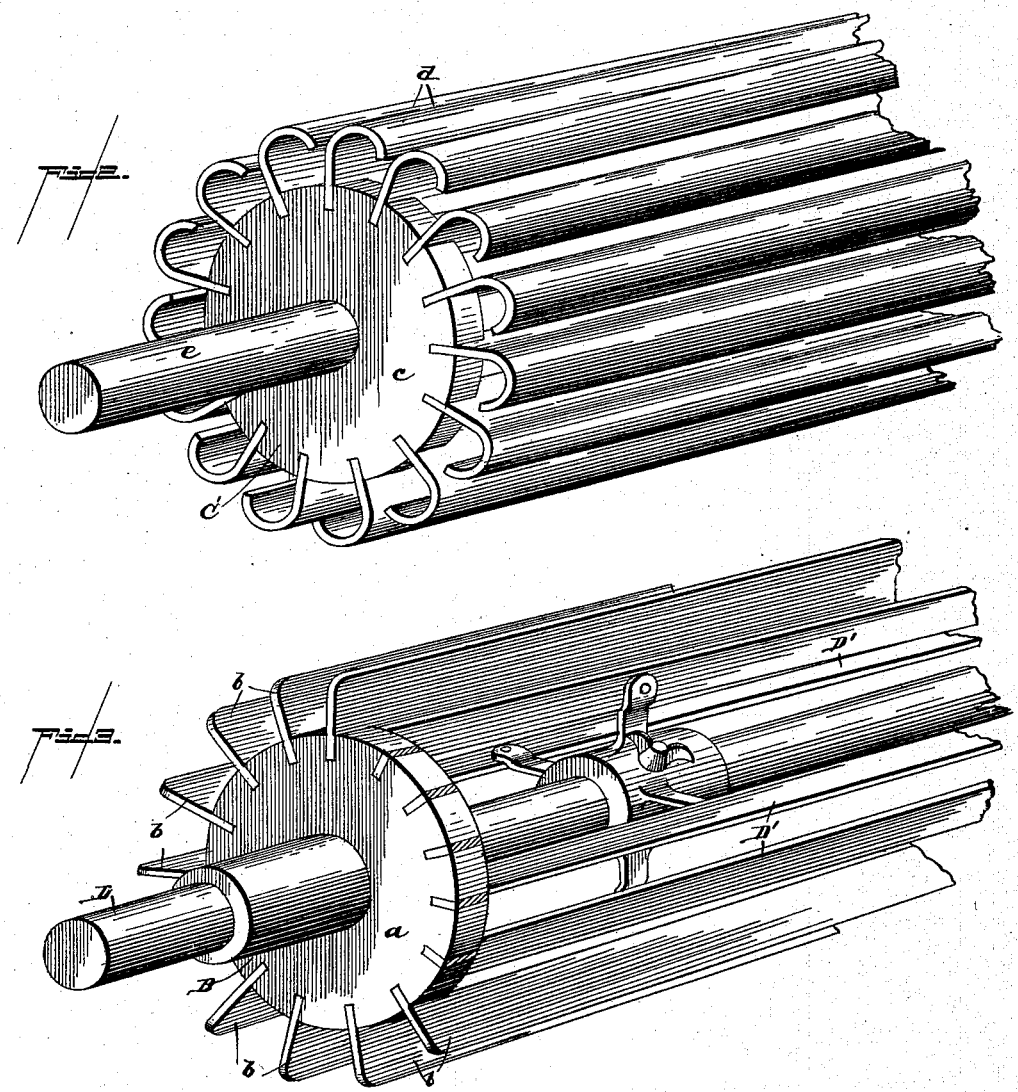
WITNESSES,
INVENTOR.
Joshua J. Green.
by Marcellus Bailey,
his Attorney.

UNITED STATES PATENT OFFICE.

JOSHUA J. GREEN, OF NEW YORK, N. Y.

MACHINE FOR DISINTEGRATING HEMP, RAMIE, &c.

SPECIFICATION forming part of Letters Patent No. 388,662, dated August 28, 1888.

Application filed February 6, 1888. Serial No. 263,154. (No model.)

*To all whom it may concern:*

Be it known that I, JOSHUA J. GREEN, of New York city, in the county and State of New York, have invented certain new and useful Improvements in Machinery for Disintegrating Hemp, Ramie, &c., of which the following is a specification.

My invention has relation to that class of machines for disintegrating the stalks of hemp, ramie, and the like, in which the pith of the stalk is crushed or broken by the action of rolls, and is then acted on by a beater, which is designed to strip and remove it from the fibrous portion of the stalk. It has been my aim to break the pith with certainty, to present it in this condition to the beater in a position where it can be most efficiently acted on by the latter, and to hold the stalk securely while this action takes place. Under my invention the same instrumentalities which break the pith also present it to the beater, and at the same time hold the stalk while the beater is acting on it. The instrumentalities which I employ for this purpose are two rolls, one of which I term the "tucker-blade roll," and the other of which I term the "ribbed presenting-roll." The tucker-blade roll in its simplest form may consist of two disks connected by longitudinal blades. The ribbed presenting-roll is a roll provided with longitudinal ribs. The two rolls mesh together, the blades of the one roll entering the spaces between the ribs of the other roll. If the stalk (which should be previously split) be passed between these two rolls with its pith side next to the tucker-blade roll, it will, by the action of the blades, be bent around the ribs, with the effect of snapping or breaking the comparatively brittle pith. When the pith is thus broken around any one rib, its two ends formed by the break will spring away from each other and from the fibrous portion of the stalk, and will project through the space between the blades of the tucker-roll into the interior of the said roll. If, therefore, a rotary beater be placed within the tucker-blade roll, so that its arms will revolve in close proximity to the inner edges of the blades, the beater will strike the inwardly-projecting ends of the pith, and will break them off and strip them from the fibrous portion of the stalk. It is in this combination of instrumentalities that my invention, mainly, is comprised.

The nature of my improvements and the manner in which the same can be carried into effect will be readily understood by reference to the accompanying drawings, in which—

Figure 1 is a longitudinal vertical central section of a machine embodying my invention in its preferred form. Fig. 2 is a perspective view, on enlarged scale, of a portion of one of the ribbed presenting-rolls. Fig. 3 is a like view, on a similar scale, of a portion of one of the tucker-blade rolls, together with the beater within said roll, some of the blades of the roll being broken away to expose the beater.

A is the frame which supports the working parts of the machine.

B B are the feed-rolls, and C is a splitting-knife, by which the stalks, as they are fed into the machine, are split in two longitudinally, one half of the stalk passing down on one side of the knife and the other half on the other side. The machine is, in fact, a double machine, each half of the stalk being operated upon by its own series of rolls. A description of one series, therefore, will answer for both.

In each half of the machine there are three pairs of rolls, B' C', each pair consisting of a tucker-blade roll, B', and a ribbed presenting-roll, C'. Theoretically, two pairs of such rolls are all that are needed in order to completely strip the stalk of its pith; but I prefer to use three pairs for greater certainty. The number of pairs may vary as desired, or as required by the nature of the stalk operated on.

In the form of tucker-blade roll shown in the drawings in illustration of my invention the roll consists of two end disks, *a*, which are connected together by the longitudinal blades *b*, which extend between and are fastened to the disks. The inner edges of the blades between the two disks are flush with the periphery of the disks, this being to permit the beater (hereinafter described) to better reach the inwardly-projecting ends of the pith. Indeed, if desired, the inner edges of the blades can be still further cut away. The disks for convenience' sake are loosely mounted upon the shaft D of the beater, the arms D' of which are arranged inside the tucker-blade roll, and are attached to spiders which are fixed to the beater-shaft. The beater is of such dimensions that its arms revolve in close proximity to the inner edges of the tucker-blades. It will be noted that by this arrangement I obtain a tucker-blade roll with a hollow interior which communicates with the openings between the tucker-blades, and a beater arranged within and so as to be capable of rotary movement independently of said roll.

The ribbed presenting-roll C shown in the drawings is one which consists also of two end disks, c, connected by longitudinal strips d, bent over into U shape at their outer ends, so as to present rounded edges, over which the stalk is to be bent. These ends are bent or curved in the arc of a circle of, say, from one and one-half to two inches diameter. This thickness of rib I find to be on the whole the most efficient practically. If the breadth or thickness of the rib be too great, the pith of the stalk will bend around the rib without breaking. It is desirable to make the rib as thick or broad as it can be and yet secure the breaking instead of bending of the stalk, because thereby a greater extent of surface of the stalk is presented at one time to the action of the beater. The two disks c are fixed to a shaft, e, and revolve with it.

The construction of the ribbed roll which has been just described is the one I prefer on the whole on the score of efficiency and economy of material; but the roll can be made in other ways. It need not be hollow, nor need it have curved metal strips such as shown. It can, for instance, be a solid wooden or metal roll, and the ribs can be solid ribs of the desired depth and thickness and made of wood, metal, or any suitable material. The ribs may be of any desired depth. A depth of one inch will answer the purpose very well. The rolls and beater are mounted in suitable housings in the frame of the machine and in such position that the blades of the tucker-blade roll will enter the spaces between the ribs of the ribbed presenting-roll. Of the two rolls the ribbed presenting-roll C is power-driven, and the tucker-blade roll B meshes with and derives its movement from the roll C, revolving on the shaft of the beater as an axis. The beater-shaft itself is power-driven at a rapid rate of speed, and in practice revolves in a direction opposite to that in which the tucker-blade roll moves, this being conducive to the best results and causing the beater to more efficiently and thoroughly strip the pith from the stalk, (which latter passes between the rolls butt-end foremost.)

I have not deemed it necessary to represent the gearing by which the several parts are driven, this being within the knowledge of the ordinary mechanic.

The first pair of rolls is arranged in position to take the half of the split stalk which passes down to it from the knife. The second pair of rolls is arranged to take the stalk as it leaves the first pair, and so on. The rolls of all the pairs rotate at the same rate of speed with the feed-rolls.

The operation is as follows: The split stalk passes to and is taken by the first pair of rolls B' C' with its pith side toward the tucker-blade roll B'. As it is held and fed along by and between these rolls, the tucker-blades act to bend the stalk around the successive ribs of the roll C', with the effect in each instance of breaking the pith of the portion thus bent. The break takes place at the crown of the rib, and when it does take place the two ends of the pith spring apart, strip themselves to some extent from the fibrous portion of the stalk, and project through the openings between the blades into the interior of the tucker-roll, where they are at once struck and removed by the beater. The stalk by its passage through the first pair of rolls is only partially stripped of its pith, those portions which are tucked into the spaces between the ribs by the tucker-blades being still unacted on. For the purpose of removing the remaining portion of the pith the second pair of rolls and their appropriate beater are provided. The stalk passes from the first pair of rolls to the second pair, and is acted on by the latter in a manner similar to that already described with reference to the first pair. For greater certainty I also pass the stalk from the second pair of rolls to and through still another pair, as indicated in the drawings, as many pairs being thus made use of as are needed to thoroughly strip the stalk of its pith. In the case of some fibrous plants—such as ramie—it is necessary, also, to act upon the exterior of the stalk, which in these plants has an integument or coating which must be removed. To this end, in such cases, I may employ an auxiliary pair of power-driven rolls, F G—the one G of rubber, the other, F, a longitudinally-corrugated roll. These two rolls are differentially speeded. The rubber roll G moves at about the same surface speed as the rolls hereinbefore described, while the corrugated roll runs somewhat faster than roll G, so that it may exercise a scraping action. The stalk after it leaves the final pair of rolls B' C' is received by this last-named pair of rolls, and as it passes between them has the objectionable integument or coating removed from the fibers. A rotating brush, H, may be employed to keep the corrugated roll clean. This arrangement of the two rolls F G and the brush H for the purpose named is not new, however, with me.

Having described my improvements and the best way now known to me of carrying the same into practical effect, I state in conclusion that I do not restrict myself to the details of construction of the various parts hereinbefore described, for manifestly the same can be varied in many particulars without departure from my invention; but

What I claim herein as new and of my own invention is as follows:

1. The combination of the ribbed presenting-roll, the tucker-blade roll, and the beater, substantially as and for the purposes hereinbefore set forth.

2. The combination of the feed-rolls, the splitting-knife, the ribbed presenting-roll, the tucker-blade roll, and the beater, substantially as and for the purposes hereinbefore set forth.

3. The combination, with the ribbed presenting-roll, of the tucker-blade roll, consisting of end disks, $a$, and connecting-blades $b$, and the beater located within and rotatable independently of said tucker-blade roll, substantially as and for the purposes hereinbefore set forth.

In testimony whereof I have hereunto set my hand this 2d day of February, 1888.

J. J. GREEN.

Witnesses:
EWELL A. DICK,
MARVIN A. CUSTIS.